(12) United States Patent
Chaichanavong

(10) Patent No.: US 7,982,985 B1
(45) Date of Patent: Jul. 19, 2011

(54) METHOD AND APPARATUS FOR ADAPTING A FINITE IMPULSE RESPONSE EQUALIZER IN A HARD DISK DRIVE READ CHANNEL

(75) Inventor: Panu Chaichanavong, Sunnyvale, CA (US)

(73) Assignee: Marvell International Ltd., Hamiilton (BM)

( * ) Notice: Subject to any disclaimer, the term of this patent is extended or adjusted under 35 U.S.C. 154(b) by 0 days.

(21) Appl. No.: 12/753,774

(22) Filed: Apr. 2, 2010

Related U.S. Application Data

(60) Provisional application No. 61/170,190, filed on Apr. 17, 2009.

(51) Int. Cl.
*G11B 20/20* (2006.01)

(52) U.S. Cl. ........................................................ 360/26
(58) Field of Classification Search .................... 360/26, 360/25, 51, 31, 53, 46, 66, 77.04; 375/232, 375/341, 296; 714/769, 709, 755
See application file for complete search history.

(56) References Cited

U.S. PATENT DOCUMENTS

| | | | | |
|---|---|---|---|---|
| 5,623,402 A * | 4/1997 | Johnson | ........................... | 700/42 |
| 5,689,532 A * | 11/1997 | Fitzpatrick | .................... | 375/341 |
| 5,892,632 A * | 4/1999 | Behrens et al. | ................. | 360/51 |
| 6,122,120 A * | 9/2000 | Shimoda | ......................... | 360/46 |
| 6,185,716 B1 * | 2/2001 | Riggle | ......................... | 714/769 |
| 6,519,108 B2 * | 2/2003 | Au et al. | ..................... | 360/77.04 |
| 6,778,345 B1 * | 8/2004 | Ozdemir | ......................... | 360/66 |
| 6,778,601 B2 * | 8/2004 | Ise et al. | ........................ | 375/232 |
| 6,804,695 B1 * | 10/2004 | Hsu | ............... | 708/322 |
| 6,816,328 B2 * | 11/2004 | Rae | .............. | 360/51 |
| 6,867,941 B1 * | 3/2005 | Ozdemir | ......................... | 360/66 |
| 7,237,173 B2 * | 6/2007 | Morita et al. | ................. | 714/755 |
| 7,454,084 B2 * | 11/2008 | Faber et al. | ................... | 382/276 |
| 7,460,613 B2 * | 12/2008 | Sahlman | ...................... | 375/296 |
| 2001/0016926 A1 * | 8/2001 | Riggle | ......................... | 714/709 |
| 2003/0043487 A1 * | 3/2003 | Morita et al. | ................... | 360/25 |
| 2007/0279780 A1 * | 12/2007 | Tomita | ............................ | 360/31 |
| 2007/0279781 A1 * | 12/2007 | Tomita | ............................ | 360/31 |
| 2007/0279788 A1 * | 12/2007 | Andersen et al. | ............... | 360/53 |

OTHER PUBLICATIONS

Li Du, Mark Spurbeck, and Richard T. Behrens; "A Linearly Constrained Adaptive FIR Filter For Hard Disk Drive Read Channels"; Aug. 1997 IEEE, Colorado; pp. 1613-1617.

* cited by examiner

*Primary Examiner* — Fred Tzeng

(57) ABSTRACT

A method and apparatus for adapting an FIR equalizer in a hard disk drive read channel which determines again direction and/or a phase direction of an FIR response c of the FIR equalizer, and calculates a constraint so that the update does not change the FIR response in its gain and/or phase direction.

22 Claims, 15 Drawing Sheets

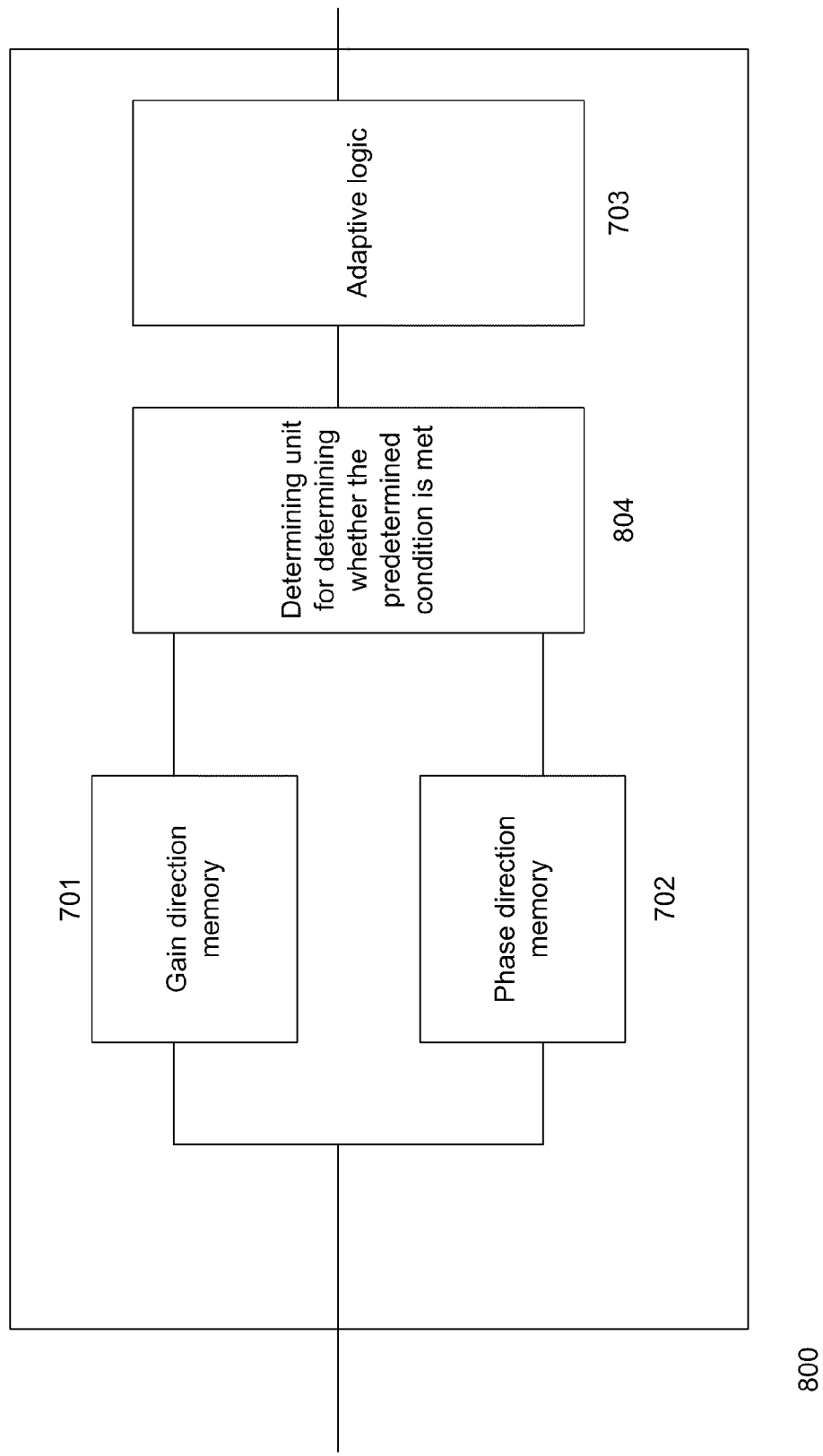

METHOD AND APPARATUS FOR ADAPTING A FINITE IMPULSE RESPONSE EQUALIZER IN A HARD DISK DRIVE READ CHANNEL

CROSS REFERENCE TO RELATED APPLICATION

This disclosure claims the benefit of priority to previously filed U.S. provisional patent application Ser. No. 61/170,190, filed Apr. 17, 2009, entitled A FIR WITH CONSTRAINT DEPENDENT ON TAPS. That provisional application is hereby incorporated by reference in its entirety.

BACKGROUND

1. Field of the Invention

This disclosure relates generally to data storage systems, and more specifically to a read channel in a hard disk drive (HDD).

2. Description of Related Art

Storage devices like hard disk drives are widely used in electronic devices, such as computers, MP3 players, video recorders, digital cameras and set-top boxes which need to store a large amount of data. FIG. 1 illustrates a conventional HDD 100, including at least one disk 110, which a spindle motor can cause to rotate around the axle of a central drive hub. A read/write transducer or head 130 is attached to a load beam 140 of a suspension via a slider and a gimbal. The load beam 140 is supported by an actuator arm 150 of an actuator 160. In operation, the actuator 160 moves the head 130 across tracks on the disk 110 until the head 130 is positioned at a target track, so that information can be written to, and read from, the surface of the disk 110.

FIG. 2 illustrates a simplified diagram of a read channel in an HDD. As shown, a read channel 200 may include an automatic gain controller (AGC) 201, a continuous time filter (CTF) 202, an analog digital converter (ADC) 203, a finite impulse response (FIR) equalizer 204, a Viterbi detector 205, a reconstruction filter 206, a subtractor 207 and adaptive logic 208. The head 130 may read data x (e.g., 0100111) from the disk 110, the automatic gain controller 201 may adjust the magnitude of the signal from the head 130, and the continuous time filter 202 may shape the signal from the automatic gain controller 201. The ADC 203 may convert the analog signal from the CTF 202 to digital signals, which are ADC samples q, and determine the phase of the ADC samples q. The FIR equalizer 204 may equalize the ADC samples q from the ADC 203 before data detection. The function of the FIR equalizer 204 is:

$$r = c * q \quad (1)$$

wherein r is a number of equalized samples at the output of the FIR equalizer 204 and c is the FIR response.

The FIR response c may be any length. In one example, the length of c is 10, i.e., c has 10 taps and $c=(c0, c1, c2, c3, c4, c5, c6, c7, c8, c9)$.

The Viterbi detector 205 detects data x from the disk 110 and outputs binary data at its output. To enable the Viterbi detector 205 to detect data x, the FIR equalizer 204 needs to make equation (2) roughly true:

$$r = x * \text{target polynomial} \quad (2)$$

The target polynomial is chosen for a particular HDD and is programmable. One example of the target polynomial is [1, 0, −1]. Other target polynomials are, of course, possible.

The FIR response c may be initialized, but initial values of the taps of c may not be good enough to realize equation (2). A feedback loop including the reconstruction filter 206, the subtractor 207 and the adaptive logic 208 may be used to adapt the response of the FIR equalizer 204. Based on detected data $\hat{x}$ at the output of the Viterbi detector 205, the reconstruction filter 206 may reconstruct the equalized samples. If there is no noise and mis-equalization, reconstructed samples at the output of the reconstruction filter 206 would be the same as the equalized samples r at the output of the FIR equalizer 204.

The subtractor 207 may receive the reconstructed samples from the reconstruction filter 206 and the equalized samples r from the FIR equalizer 204 and obtain their differences, which are error samples.

The adaptive logic 208 may receive the error signals from the subtractor 207 and the ADC samples from the ADC 203, and adapt the response of the FIR equalizer 204 to minimize the error samples.

One problem with the read channel 200 in FIG. 2 results from the interactions among the FIR equalizer 204, the AGC 201 and the ADC 203. Since the FIR response c has its own gain and phase, the adaptation of the FIR equalizer 204 may change the gain and phase of the FIR response c, which may affect the gain and phase of the read channel controlled by the AGC 201 and ADC 203 respectively. The interactions may cause tap values of the FIR response c to go in any direction, resulting in, e.g., a larger and larger gain:

Conventional approaches typically use a constraint at the adaptive logic 208 to restrict the interactions during the adaptation process. One prior art approach is called Fix2 constraint, which fixes values of certain taps of the FIR response c, e.g., c3 and c4. Another prior art approach is called Rank2 constraint, which fixes two quantities of the FIR response, e.g., c0-c2+c4-c6+c8, and c1-c3+c5-c7+c9, while allowing individual tap values to change.

One problem with these just-mentioned constraints is that the constraints are not based on tap values of the FIR response c. In addition, when the constraints are 0 or very small, the constraints may become useless.

BRIEF DESCRIPTION OF THE DRAWING FIGURES

Embodiments of the present invention are described herein with reference to the accompanying drawings, similar reference numbers being used to indicate functionally similar elements.

Figure 3A:
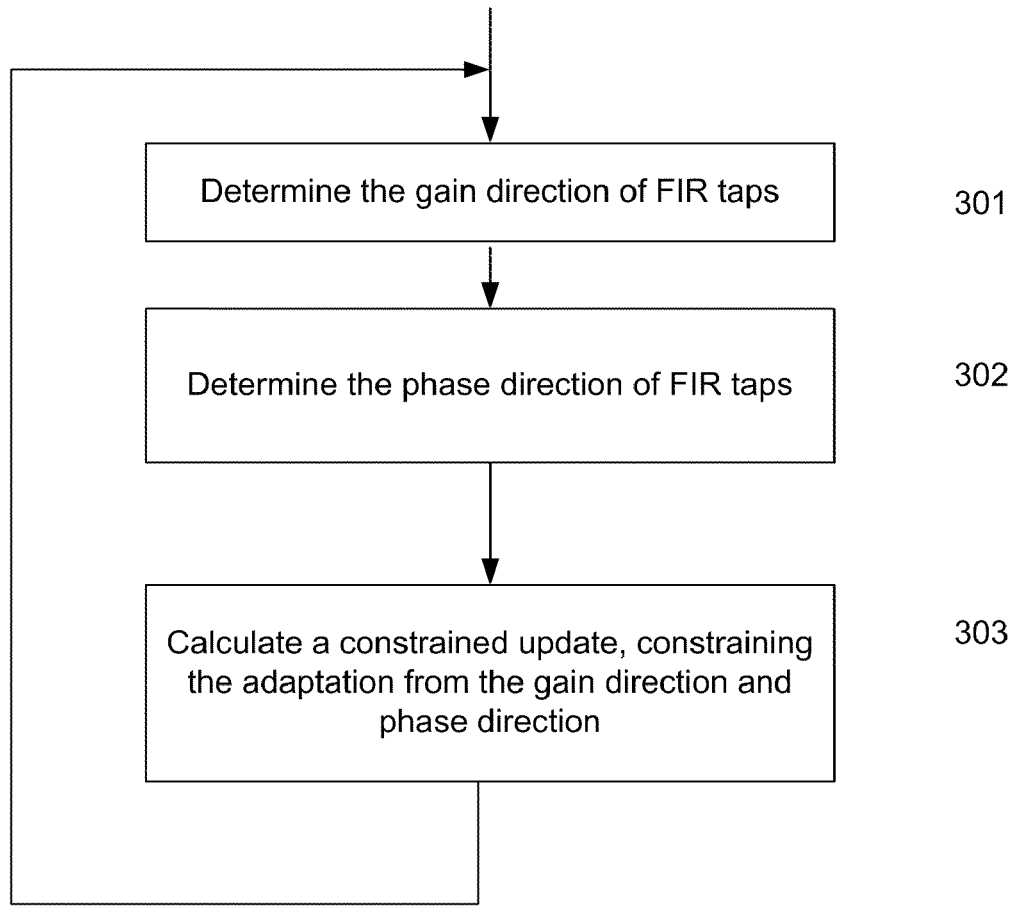
Figure 3B:
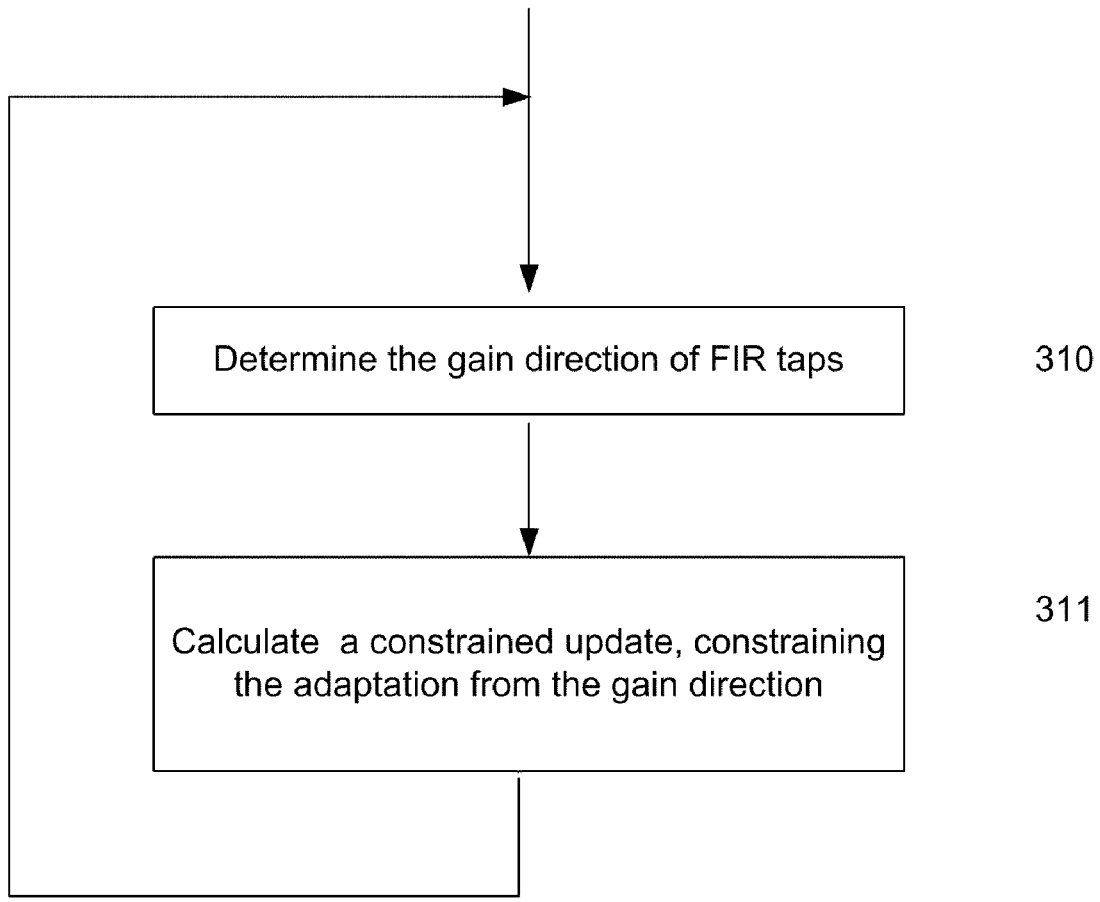
Figure 3C:
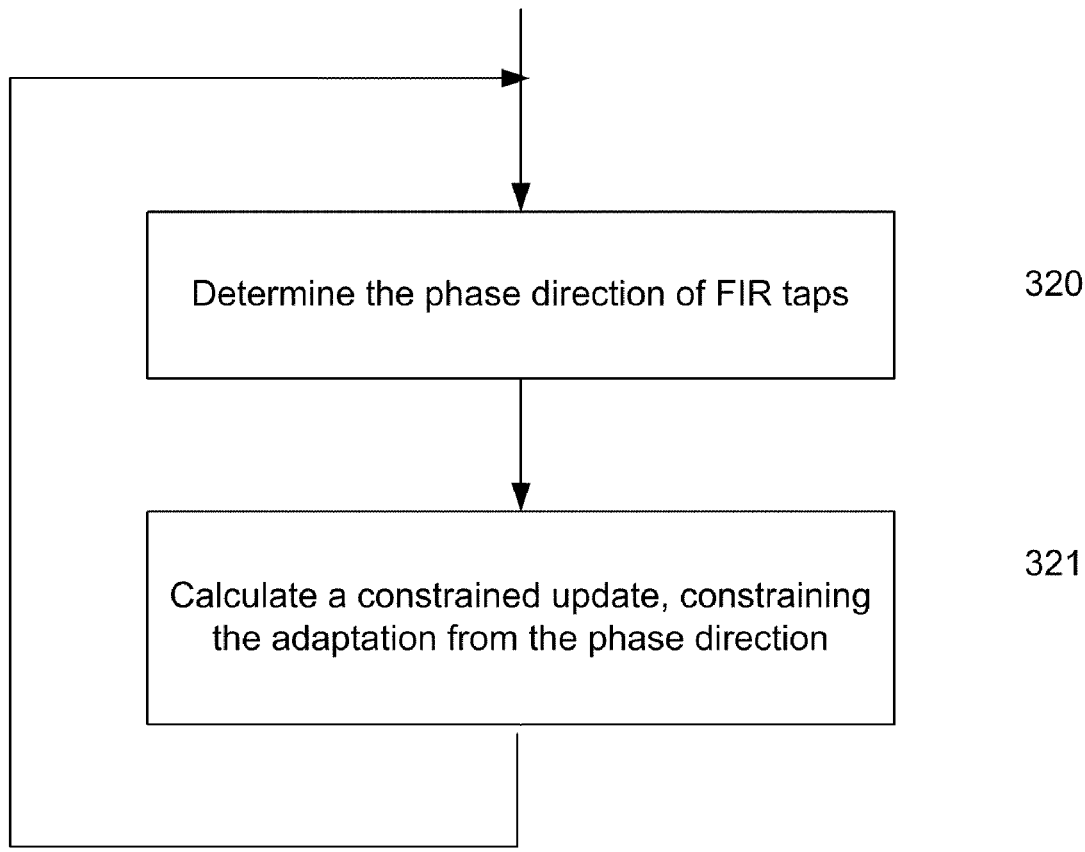

Each of FIGS. 3A, 3B and 3C illustrates a flowchart of a method for adapting an FIR equalizer in a hard disk drive read channel according to one embodiment of the present invention.

Figure 4:
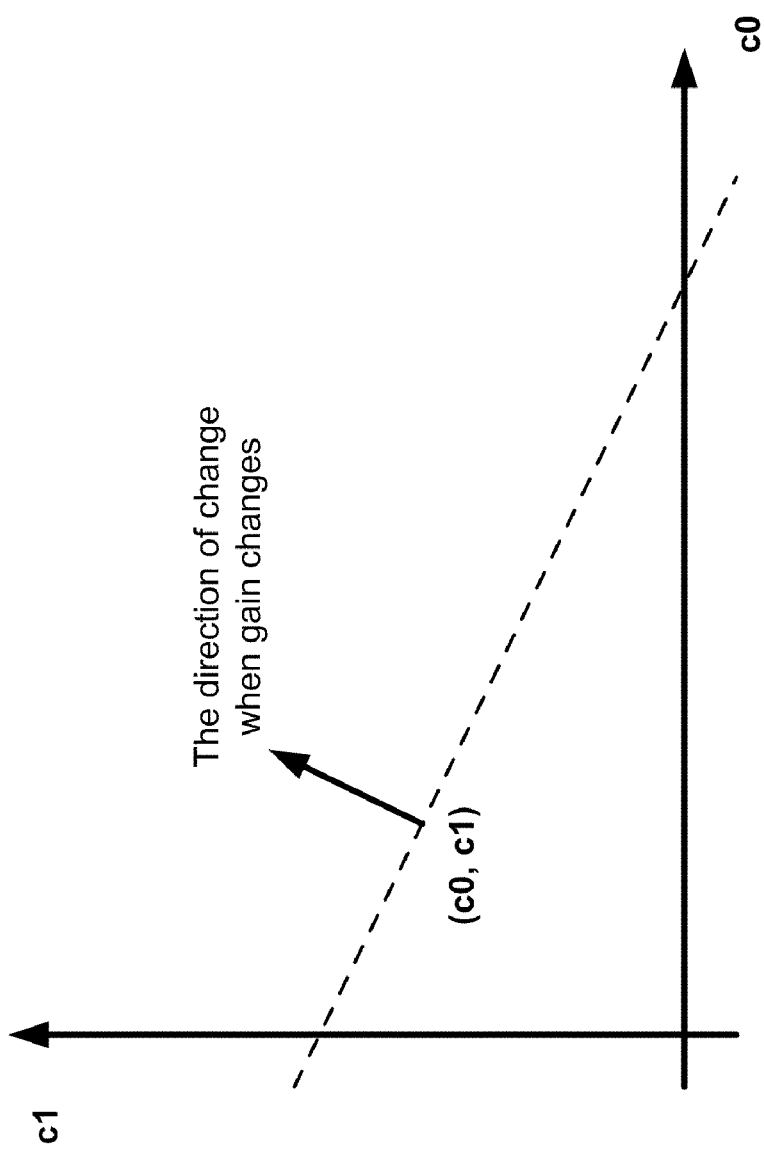

FIG. 4 illustrates an example of gain direction of FIR taps.

Figure 5:
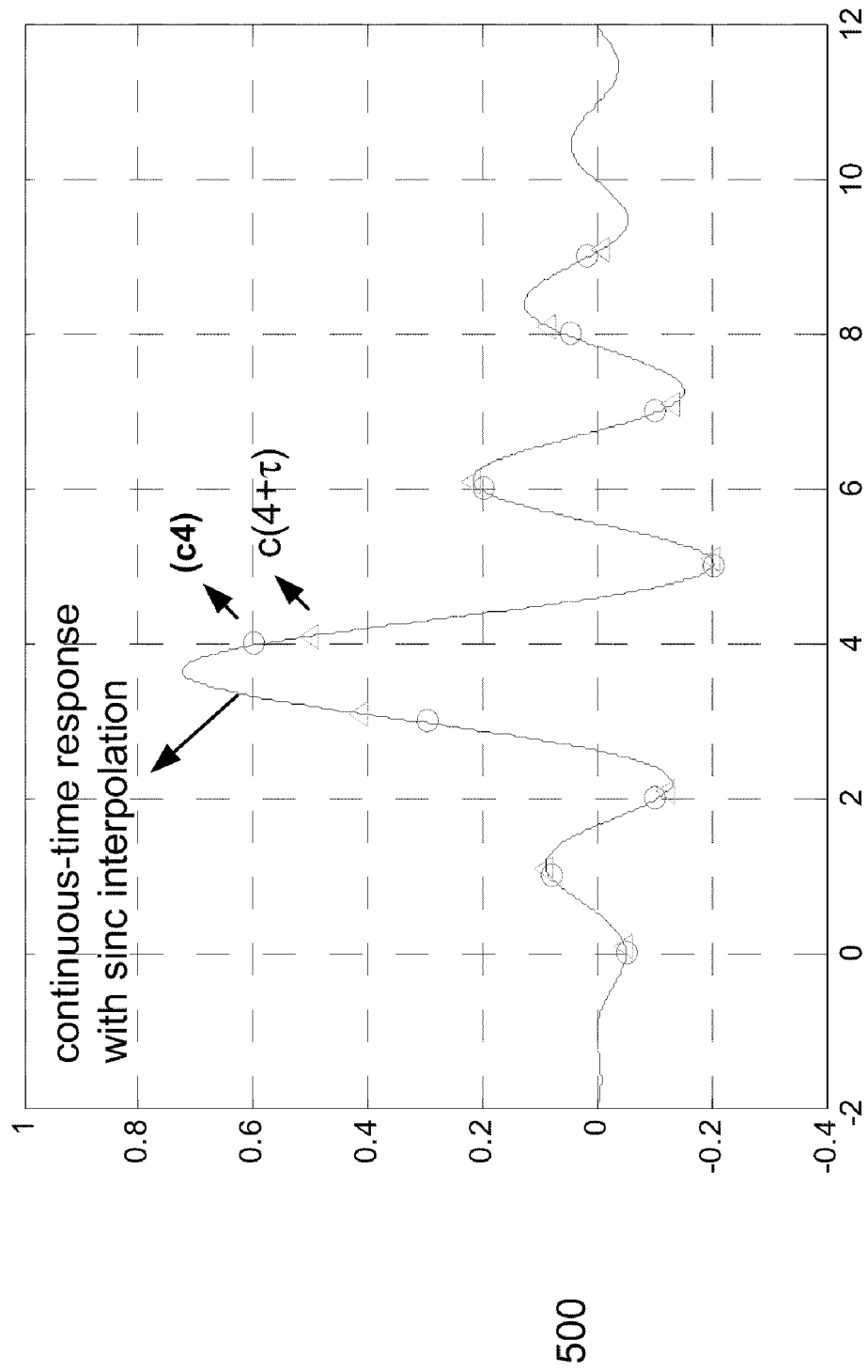

FIG. 5 illustrates an example of an FIR response c in the continuous time domain.

Figure 6A:
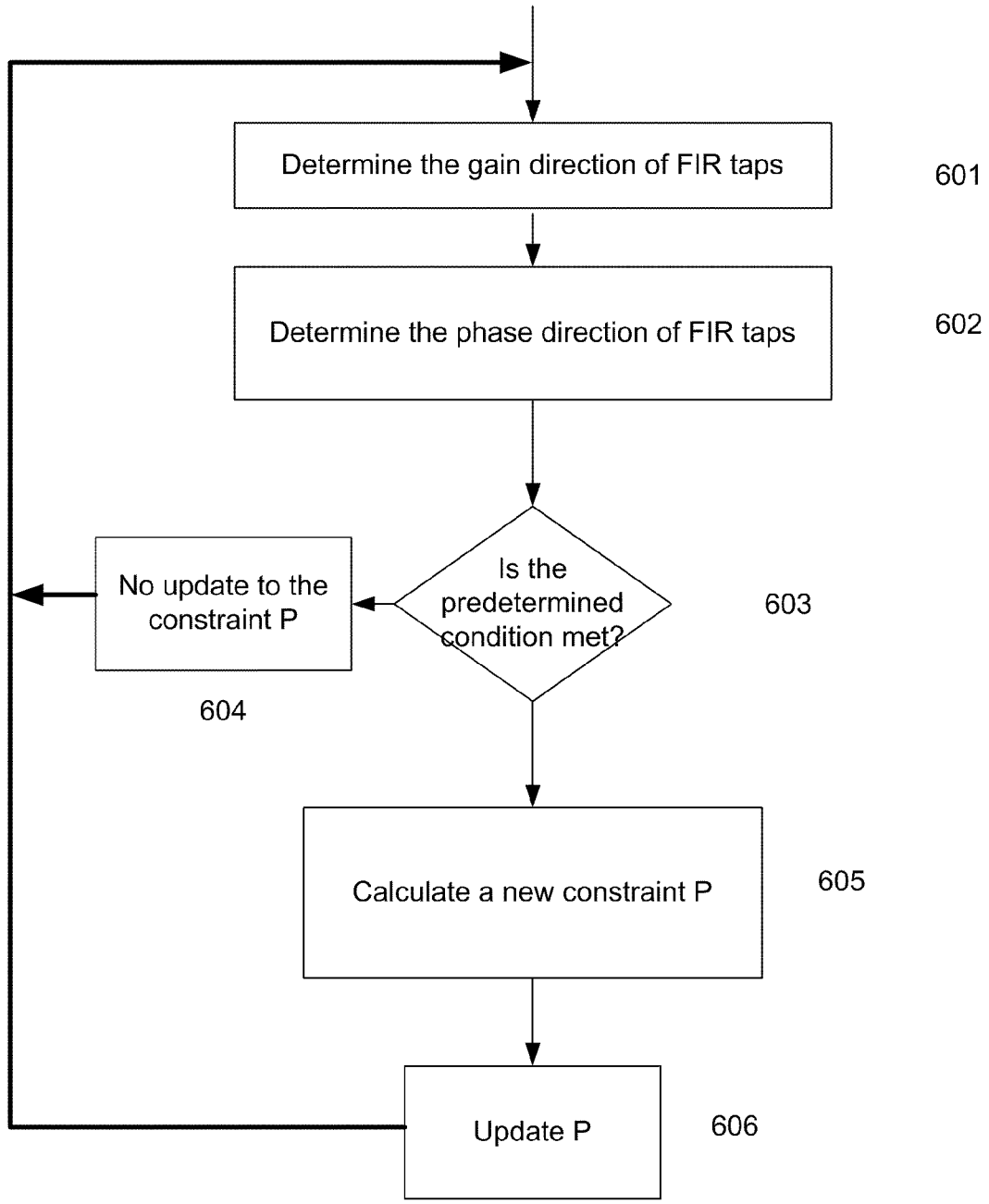

FIG. 6A is a flowchart of a method for adapting an FIR equalizer in a hard disk drive read channel according to one embodiment of the present invention.

FIG. 68 illustrates an example of geometric relations between FIR taps and adaptation.

Figure 6B:
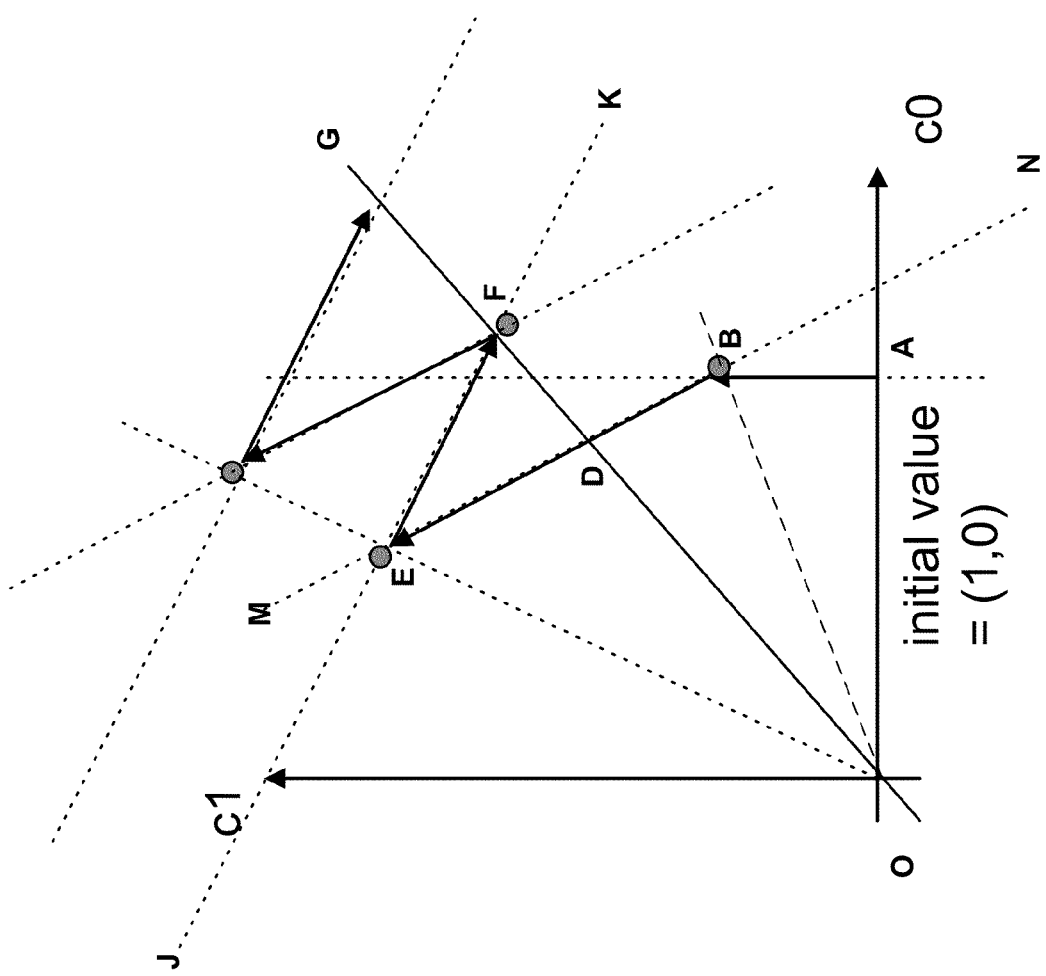
Figure 6C:
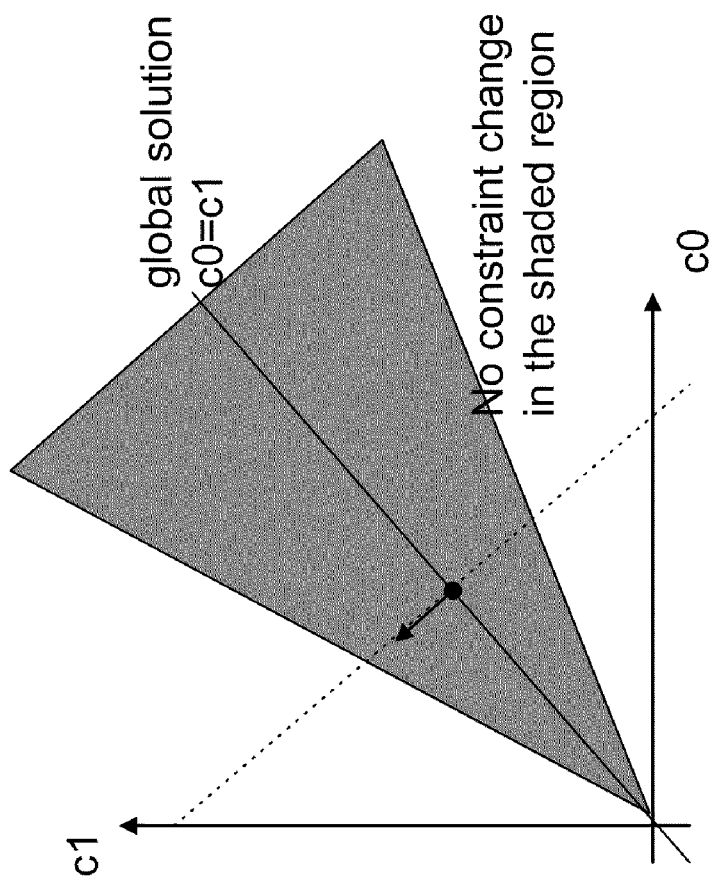

FIG. 6C illustrates a method for adapting an FIR equalizer in a hard disk drive read channel according to one embodiment of the present invention.

Figure 7A:
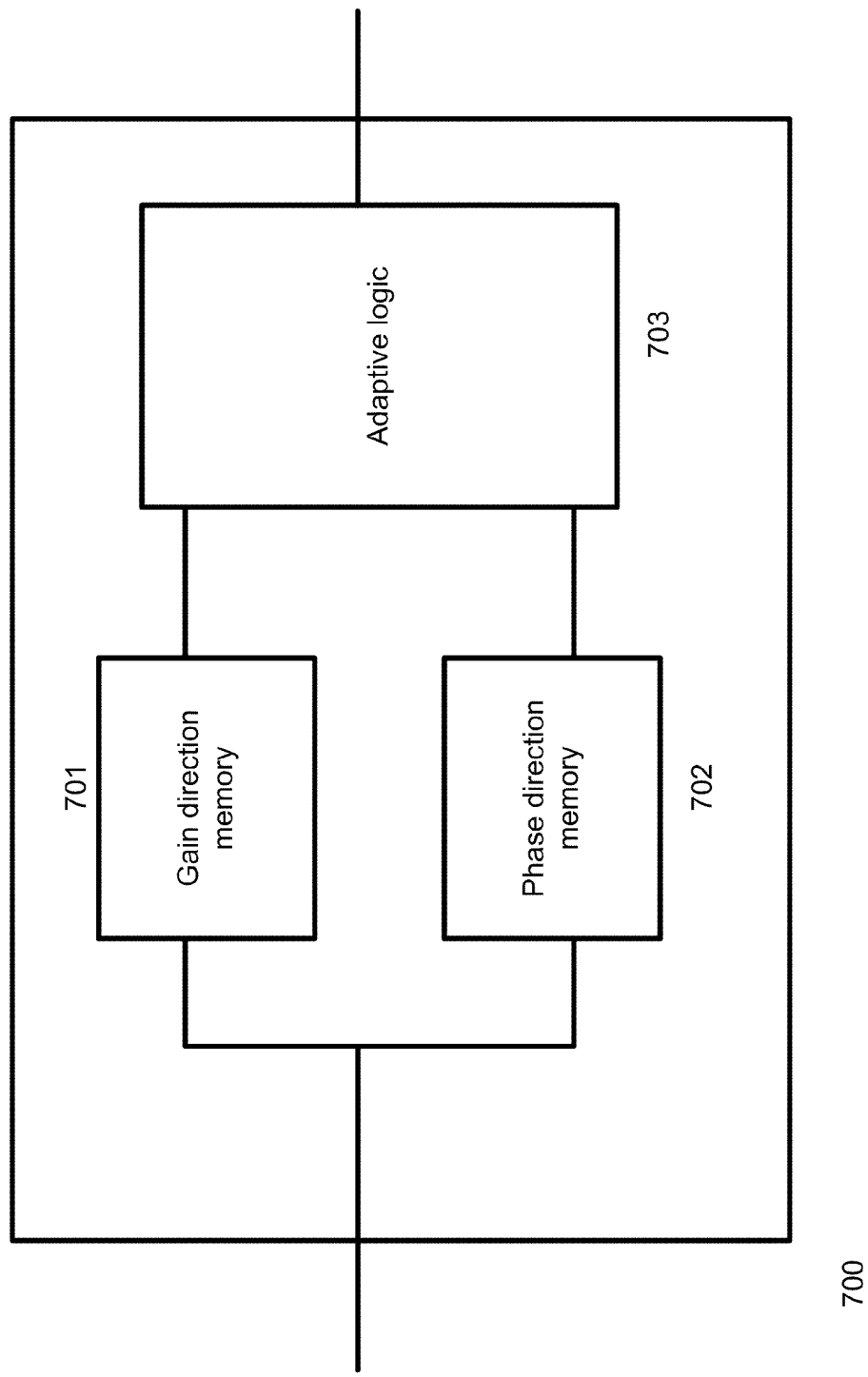
Figure 7B:
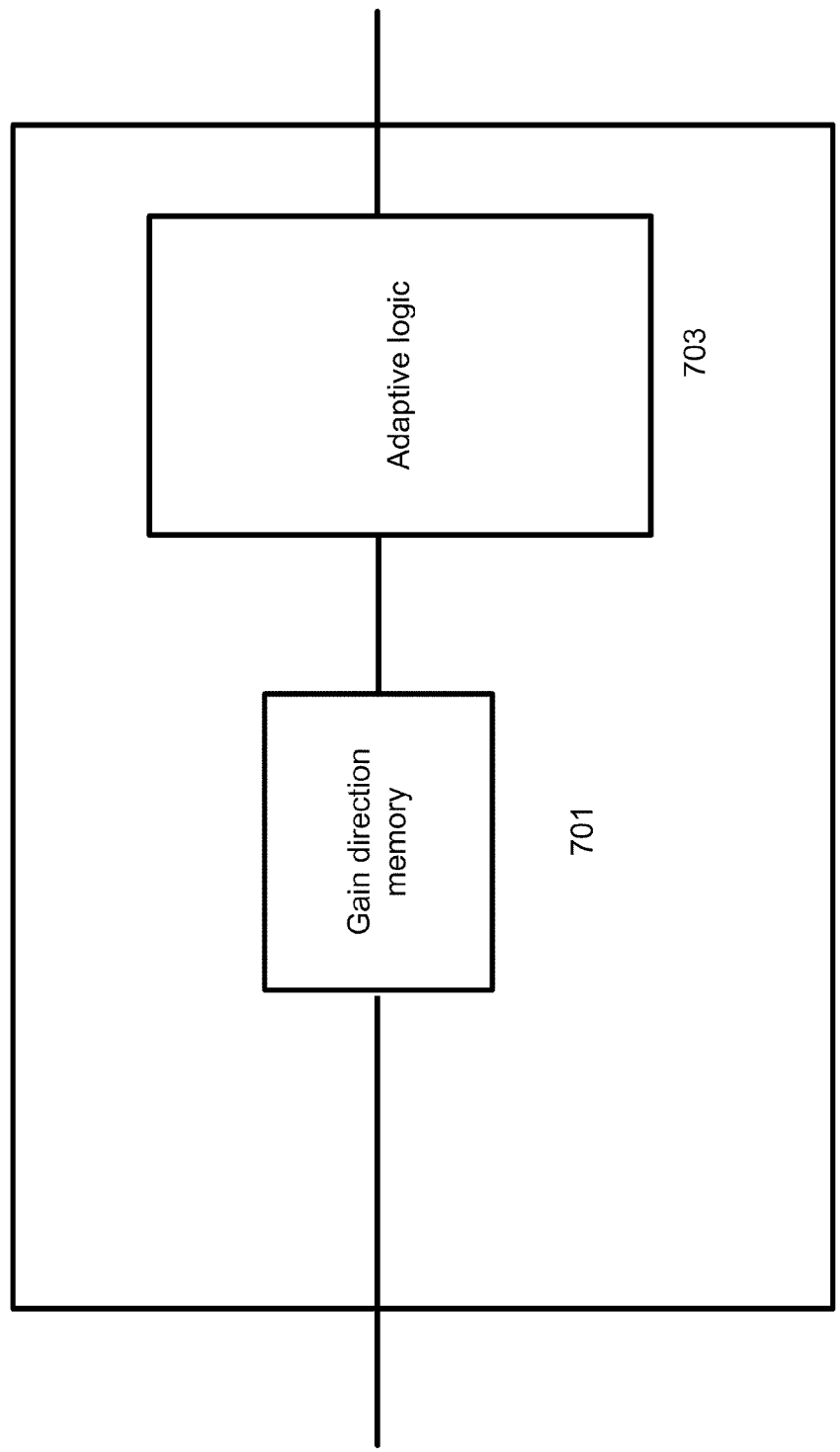
Figure 7C:
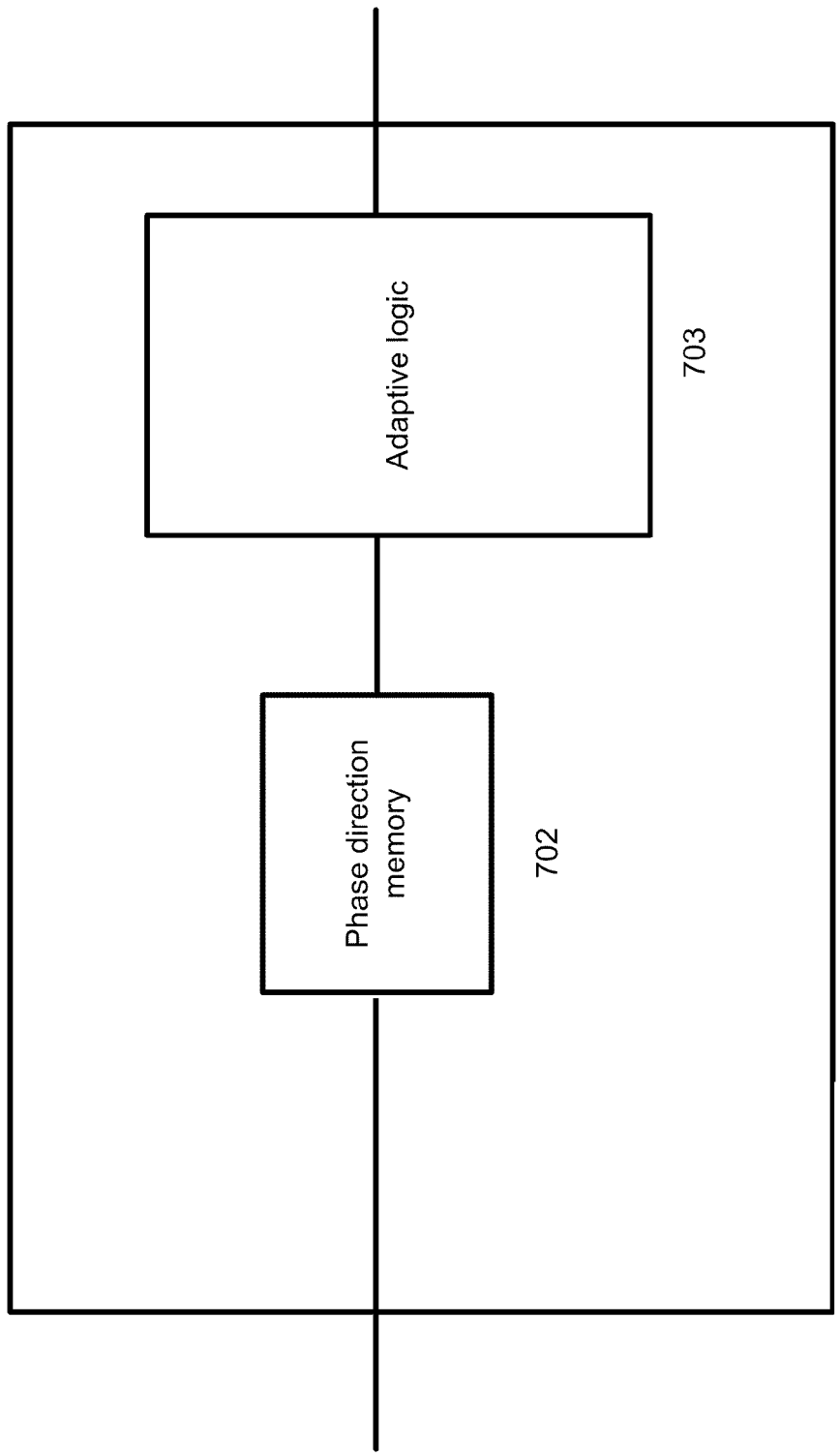

Each of FIGS. 7A, 7B and 7C illustrates a block diagram of an FIR adapting device in a hard disk drive read channel according to embodiments of the present invention.

FIG. 8 is a block diagram of an FIR adapting device in a hard disk drive read channel according to one embodiment of the present invention.

Figure 9:
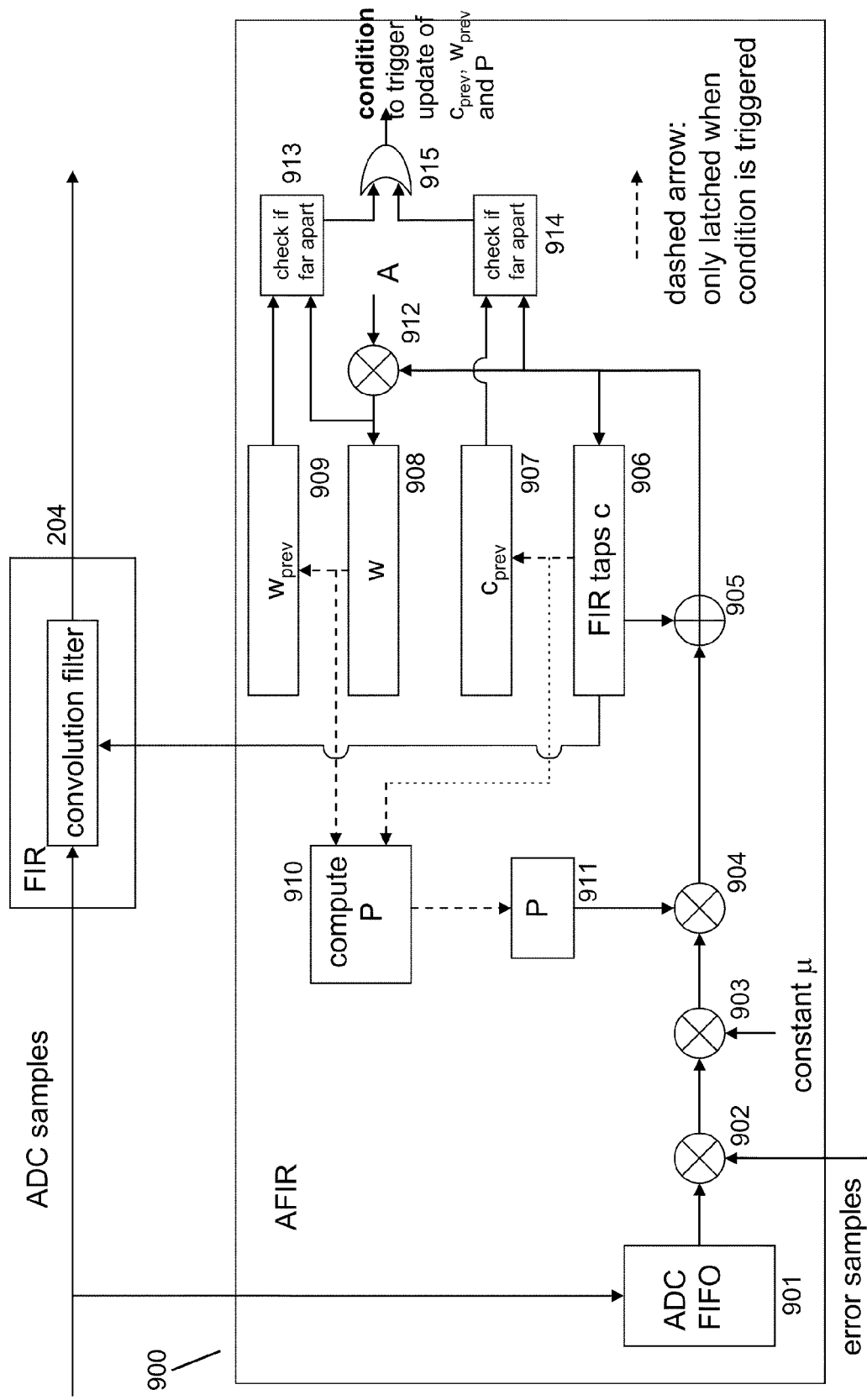

FIG. 9 is a circuit diagram of an FIR adapting device in a hard disk drive read channel according to one embodiment of the present invention.

SUMMARY OF THE INVENTION

An apparatus for (i) adapting a finite impulse response (FIR) equalizer in a hard disk drive read channel and (ii) compensating for an error signal, the apparatus comprises: a first memory to store a first direction of an FIR response of the FIR equalizer; and adaptive logic to (i) receive the first direction from the first memory and (ii) calculate a constraint to adapt the FIR response to reduce the error signal, wherein the constraint prevents adaptation of the FIR response going into the first direction.

According to one aspect of the present invention, the first memory is a gain direction memory; and the first direction is a gain direction of the FIR response, wherein the gain direction of the FIR response is a change of direction of the FIR response responding to a change in a gain of the FIR response.

According to one aspect of the present invention, the first memory is a phase direction memory; and the first direction is a phase direction of the FIR response, wherein the phase direction of the FIR response is a change of a direction of the FIR response responding to a change in a phase of the FIR response.

According to one aspect of the present invention, the apparatus further comprises: a second memory to store a second direction of the FIR response of the FIR equalizer, wherein the second direction is a phase direction corresponding to a change of a direction of the FIR response responding to a change in a phase of the FIR response.

According to one aspect of the present invention, the adaptive logic determines the constraint as follows:

$$P = I - V(V^T V)^{-1} V^T, \text{ and}$$

$$V = [c\ w]$$

wherein P is the constraint, I is the identity matrix, c is the gain direction and w is the phase direction.

According to one aspect of the present invention, the apparatus further comprises: a first determining unit to (i) determine whether a first predetermined condition is met and (ii) enable the adaptive logic to calculate the constraint only in response to the first predetermined condition having been met.

According to one aspect of the present invention, the first predetermined condition is:

$$c^T c_{prev} / (\|c\| \cdot \|cprev\|) < T1$$

wherein c and cprev are current and previous values of the gain direction respectively, T1 is a threshold, and 0<T1<1.

According to one aspect of the present invention, the apparatus further comprises a second determining unit to (i) determine whether a second predetermined condition is met and (ii) enable the adaptive logic to calculate the constraint only in response to the second predetermined condition having been met, wherein the second predetermined condition is:

$$w^T w_{prev} / (\|w\| \cdot \|wprev\|) < T2$$

wherein w and wprev are current and previous values of the phase direction, T2 is a threshold, and 0<T2<1.

According to one aspect of the present invention, the apparatus further comprises a third determining unit to (i) determine whether a third predetermined condition is met and (ii) enable the adaptive logic to calculate the constraint only in response to the third predetermined condition having been met, wherein the third predetermined condition is:

$$w^T w_{prev} / (\|w\| \cdot \|wprev\|) < T2$$

wherein w and $w_{prev}$ are current and previous values of the phase direction, T2 is a threshold, and 0<T2<1.

According to one aspect of the present invention, the constraint limits adaptation of the FIR response to stay generally in a direction perpendicular to the first direction.

DETAILED DESCRIPTION

A method and apparatus for adapting an FIR equalizer in a hard disk drive read channel which determines a gain direction and/or a phase direction of an FIR response c of the FIR equalizer, and calculates a constraint so that the update does not change the FIR response in its gain and/or phase direction.

FIG. 3A is a flowchart of a method for adapting an FIR equalizer in a hard disk drive read channel according to one embodiment of the present invention.

At 301, the gain direction of an FIR response is determined. The gain direction refers to the change of the direction of the FIR response c responding to a change in the gain. Assuming that a base FIR response is $c=[c0\ c1\ c2\ \ldots\ c9]^T$, and its gain and phase are 1 and 0 respectively, then, as shown in FIG. 4, when the gain changes from 1 to 1+α, the FIR response c changes to:

$$(1+\alpha)c = c + c\alpha \quad (3)$$

Thus, the direction of change is cα. Since α is a constant, the gain direction is the FIR response c itself.

At 302, the phase direction of the FIR response is determined. The phase direction refers to the change of the direction of the FIR response c responding to a change in the phase. FIG. 5 shows an example of FIR response c in the continuous time domain. As shown, taps c0, c1, c2, ... c9 of the FIR response c may be shifted by a phase τ. Then $$c(\tau) \approx c + \tau \cdot w \quad (4)$$

wherein w is the phase direction.
The continuous function c(t) of the curve 500 is:

$$c(t) = c0 \sin c(t) + c1 \sin c(t-1) + \ldots + c9 \sin c(t-9) \quad (5)$$

The base FIR response may also be written as:

$$c = [c(0), c(1), c(2), \ldots c(9)]^T \quad (6)$$

wherein c(0) represents c(t) at time 0, c(1) represents c(t) at time 1, ... and c(9) represents c(t) at time 9.

The value of c(0), c(1), ... and c(9) may be obtained using function (5). When t=0, c(0)=c0; when t=1, c(1)=c1, ... and when t=9, c(9)=c9. In other words:

$$c = [c(0), c(1), c(2), \ldots c(9)]^T = [c0, c1, \ldots, c9]^T \quad (7)$$

When c is perturbed by τ, the function (6) may change to:

$$c\text{ perturbed by } \tau = [c(\tau) c(\tau+1) \ldots c(\tau+9)]^T \quad (8)$$

When τ is small, $$c(\tau) \approx c(0) + \tau c'(0)$$

$$c(\tau+1) \approx c(1) + \tau c'(1)$$

...

$$c(\tau+9) \approx c(9) + \tau c'(9) \quad (9)$$

wherein c'(0) is the derivative of c at time 0, c'(1) is the derivative of c at time 1, ... and c'(9) is the derivate of c at time (9).

From (8) and (9), it can be seen:

$$c_{perturbed\,by\,\tau} = [c(\tau)c(\tau+1)\ldots c(\tau+9)]^T = \quad (10)$$

$$[c(0)+c(1)+\ldots c(9)]^T + \tau \begin{bmatrix} c'(0) \\ c'(1) \\ c'(2) \\ c'(3) \\ c'(4) \\ c'(5) \\ c'(6) \\ c'(7) \\ c'(8) \\ c'(9) \end{bmatrix} = c + \tau \begin{bmatrix} c'(0) \\ c'(1) \\ c'(2) \\ c'(3) \\ c'(4) \\ c'(5) \\ c'(6) \\ c'(7) \\ c'(8) \\ c'(9) \end{bmatrix}$$

From (4) and (10), it can be seen that the phase direction w is:

$$w = \begin{bmatrix} c'(0) \\ c'(1) \\ c'(2) \\ c'(3) \\ c'(4) \\ c'(5) \\ c'(6) \\ c'(7) \\ c'(8) \\ c'(9) \end{bmatrix}$$

Following the properties of the sinc function, $$w = \begin{bmatrix} c'(0) \\ c'(1) \\ c'(2) \\ c'(3) \\ c'(4) \\ c'(5) \\ c'(6) \\ c'(7) \\ c'(8) \\ c'(9) \end{bmatrix} = \begin{bmatrix} 0 & 1 & -1/2 & 1/3 & -1/4 & 1/5 & -1/6 & 1/7 & -1/8 & 1/9 \\ -1 & 0 & 1 & -1/2 & 1/3 & -1/4 & 1/5 & -1/6 & 1/7 & -1/8 \\ 1/2 & -1 & 0 & 1 & -1/2 & 1/3 & -1/4 & 1/5 & -1/6 & 1/7 \\ -1/3 & 1/2 & -1 & 0 & 1 & -1/2 & 1/3 & -1/4 & 1/5 & -1/6 \\ 1/4 & -1/3 & 1/2 & -1 & 0 & 1 & -1/2 & 1/3 & -1/4 & 1/5 \\ -1/5 & 1/4 & -1/3 & 1/2 & -1 & 0 & 1 & -1/2 & 1/3 & -1/4 \\ 1/6 & -1/5 & 1/4 & -1/3 & 1/2 & -1 & 0 & 1 & -1/2 & 1/3 \\ -1/7 & 1/6 & -1/5 & 1/4 & -1/3 & 1/2 & -1 & 0 & 1 & -1/2 \\ 1/8 & -1/7 & 1/6 & -1/5 & 1/4 & -1/3 & 1/2 & -1 & 0 & 1 \\ -1/9 & 1/8 & -1/7 & 1/6 & -1/5 & 1/4 & -1/3 & 1/2 & -1 & 0 \end{bmatrix} \begin{bmatrix} c0 \\ c1 \\ c2 \\ c3 \\ c4 \\ c5 \\ c6 \\ c7 \\ c8 \\ c9 \end{bmatrix} = Ac \quad (11)$$

Thus, the phase direction w is a matrix A times the FIR response c.

At 303, a constrained FIR update d is calculated such that the adaptation will not go into the gain direction and the phase direction of the FIR response. To decouple the adaptation of the FIR response c and the gain and phase direction of the read channel, (12) and (13) need to be satisfied:

$$c^T d = 0 \quad (12)$$

$$w_T d = 0 \quad (13)$$

In one embodiment, the following function can be used to calculate the constrained FIR update d:

$$d = Pu \quad (14)$$

$$P = I - V(V^T V)^{-1} V^T, \text{ and} \quad (15)$$

$$V = [cw] \quad (16)$$

wherein u is an unconstrained update to the FIR response, P is a constraint, and I is the identity matrix.

Functions (14), (15) and (16) indicated above are only used as examples, and other functions may be used for the constrained adaptation, as long as the adaptation does not change the tap values in the gain and phase direction.

In the embodiment shown in FIG. 3A, both the gain direction and the phase direction are considered when adapting the FIR response c. For some read channels, the adaptation may only consider one direction and ignore the other.

In addition, gain direction and phase direction may be used together with other constraints. In one embodiment, three constraints may be imposed: the gain direction, the phase direction and a fixed tap constraint, e.g., fixed tap 3. The equation (16) may change to:

$$V = [cws] \quad (17)$$

wherein $s = [0\ 0\ 0\ 1\ 0\ 0\ 0\ 0\ 0\ 0]^T$

In other words, each column of matrix V represents a constraint on the update direction. The first and second constraints may be equations (12) and (13), and the last constraint requires that tap $d_3 = 0$.

FIG. 3B illustrates an alternative to the method in FIG. 3A. As shown, the gain direction is determined at 310, and a constrained FIR update is calculated based on the gain direction at 311. In this alternative, the phase direction may be ignored. As shown in FIG. 4, to decouple the adaptation of the FIR response c and the gain direction of the read channel, the adaptation of the FIR response c should stay on the dashed line that is diagonal to the direction of the gain change.

FIG. 3C illustrates another alternative to the method shown in FIG. 3A. As shown, the phase direction is determined at 320, and a constrained FIR update is calculated based on the phase direction at 321. In this alternative, the gain direction may be ignored.

FIG. 6A is a flowchart of a method for adapting an FIR equalizer in a hard disk drive read channel according to one embodiment of the present invention.

Assuming that an FIR response c has two taps, C0 and c1, and assuming that only the gain loop is on, and ignoring the phase loop, FIG. 6B shows an example of the geometric relations of the FIR taps and adaptation. The initial tap may be

[1, 0] at A, the global solution lies on the line c0=c1, which is the OG line, and the initial constraint on the update direction d is $$c^T d = [10] = 0 \qquad (18)$$

The constraint may be updated, e.g., at B, before the tap value reaches the global solution. Since the gain direction is along the OB line, the same as the tap, the update direction should be along the MN line, which is generally perpendicular to the gain direction line OB. The tap value may reach the global solution at D, with the converged value (0.8, 0.8). When the tap value is perturbed by noise and fluctuates from D to E, the gain direction may change to OE, and the update direction may change to JK. Consequently, the tap value may move to F, instead of returning to a Embodiments of the present invention solve this problem by keeping previous values of c and w which specify the directions of constraints, defining a predetermined condition, and updating the constraint P only when the predetermined condition is satisfied, so that the tap may return to D, instead of diverging.

At 601, the gain direction of the FIR response c may be determined.

At 602, the phase direction of the FIR response c may be determined.

At 603, it is determined whether a predetermined condition is met. In one embodiment, the predetermined condition is:

$$c^T c_{prev}/(\|c\| \cdot \|cprev\|) < T1 \qquad (19)$$

wherein c and cprev are the current and previous value of the gain direction respectively, T1 is a threshold, and 0<T1<1.

The predetermined condition (19) is used to determine whether the current c is far enough from its previous value cprev. In one embodiment, T1=0.98. The threshold T1 may be other values, as long as it can be used to check whether cprev and c are far apart. Another example of the predetermined condition may be:

$$\|c - c_{prev}\| > \epsilon, \qquad (20)$$

wherein $\epsilon$ can be any positive number.

In one embodiment, the predetermined condition is:

$$w^T wprev/(\|w\| \cdot \|wprev\|) < T2 \qquad (21)$$

wherein w and wprev are the current and previous values of the phase direction, T2 is a threshold, and 0<T2<1.

In one embodiment, T2=0.98. The threshold T2 may be other values, as long as it can be used to check whether wprev is far enough from w. Another example of the condition may be:

$$\|w - w_{prev}\| > \theta \qquad (22)$$

wherein $\theta$ can be any positive number.

If the predetermined condition is met, the procedure may proceed to 605 to calculate a new constraint P, e.g., with functions (15) and (16). At 606, the constraint P may be updated, cprev may be updated to c, and wprev may be updated to w. The procedure may then return to 601.

If the condition is not met, the procedure may proceed to 604, the constraint P is not updated, the previous value may continue to be used and the procedure may return to 601.

FIG. 6C illustrates the adaptation of the method shown in FIG. 6A from a different angle. As shown, the constraint P is updated only when it is outside the shaded region, and is not updated in the shaded region.

Although in FIG. 6A, both the gain direction and the phase direction are considered during the adaptation, it should be understood that one of them may be ignored.

FIG. 7A is a block diagram of an FIR adaptive device in a hard disk drive read channel according to one embodiment of the present invention. The FIR adaptive device 700 may be used to replace the adaptive logic 208 in FIG. 2 and its operation may follow the flowchart shown in FIG. 3A. As shown, the FIR adaptive device 700 may have a gain direction memory 701, a phase direction memory 702, and adaptive logic 703. The gain direction memory 701 may store the gain direction of the FIR response c, and the phase direction memory 702 may store the phase direction of the FIR response c. In contrast to the adaptive logic 208 in FIG. 2, the adaptive logic 703 in FIG. 7A may calculate an update to the constraint P, constraining the adaptation from going into the gain direction and the phase direction, e.g., using equations (15) and (16).

FIG. 7B illustrates an alternative to the FIR adaptive device in FIG. 7A, which only has the gain direction memory 701 and the adaptive logic 703. In this embodiment, the phase direction is ignored during the adaptation.

FIG. 7C illustrates another alternative to the FIR adaptive device in FIG. 7A, which only has the phase direction memory 702 and the adaptive logic 703. In this embodiment, the gain direction is ignored during the adaptation.

FIG. 8 is a block diagram of an FIR adaptive device in a hard disk drive read channel according to one embodiment of the present invention. The FIR adaptive device 800 may be used to replace the adaptive logic 208 in FIG. 2 and its operation may follow the flowchart shown in FIG. 6A. In addition to the gain direction memory 701, the phase direction memory 702 and the adaptive logic 703 in the FIR adaptive device 700, the FIR adaptive device 800 may also have a determining unit 804 for determining whether a predetermined condition for updating the constraint P is met, so that the adaptive logic 703 calculates a new constraint P only when the predetermined condition is met. The predetermined condition may be, e.g. (19), (20), (21) or (22).

FIG. 9 is a circuit diagram of an FIR adaptive device in a hard disk drive read channel according to one embodiment of the present invention. The circuit in FIG. 9 may be used to realize the FIR adaptive device 800 in FIG. 8. An FIR adaptive device 900 may have a number of memory units, e.g., a FIFO 901 for storing ADC samples; a memory 911 for storing a value of P; memories 906 and 907 for storing the current and previous values of the FIR response c; and memories 908 and 909 for storing the current and previous values of phase direction w. Memories 906 and 908 can correspond to the gain direction memory 701 and phase direction memory 702 in FIG. 8. The FIR adaptive device 900 includes a number of logic circuits, such as 910, 912, 913, 914, 915, multipliers 902, 903, 904 and 912, and an adder 905. The logic 910 may correspond to the adaptive logic 703 in FIG. 8, and the logic 913, 914 and 915 may correspond to the determining unit 804 in FIG. 8.

Figure 1:
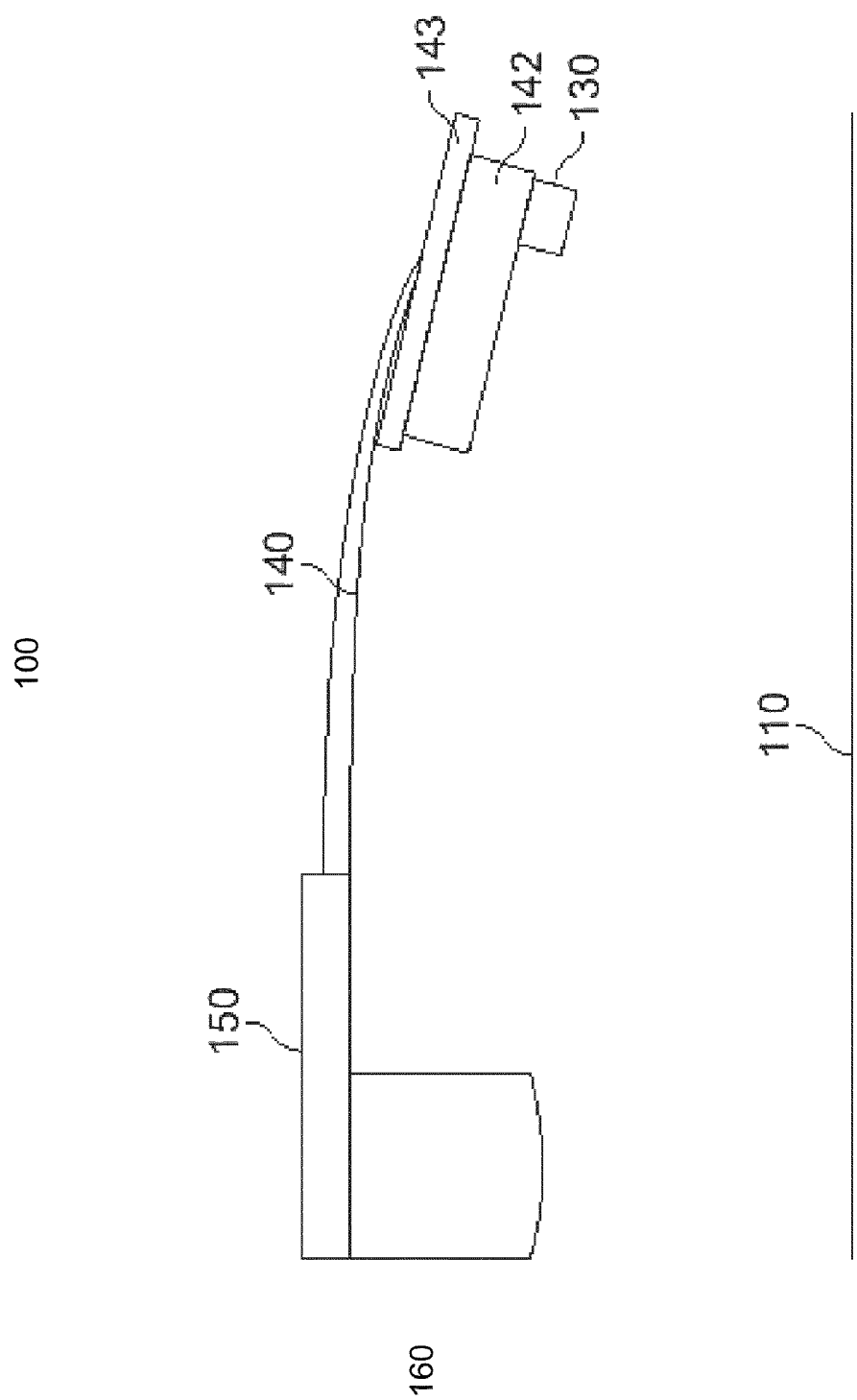
FIG. 1 illustrates portions of a conventional hard disk drive.
Figure 2:
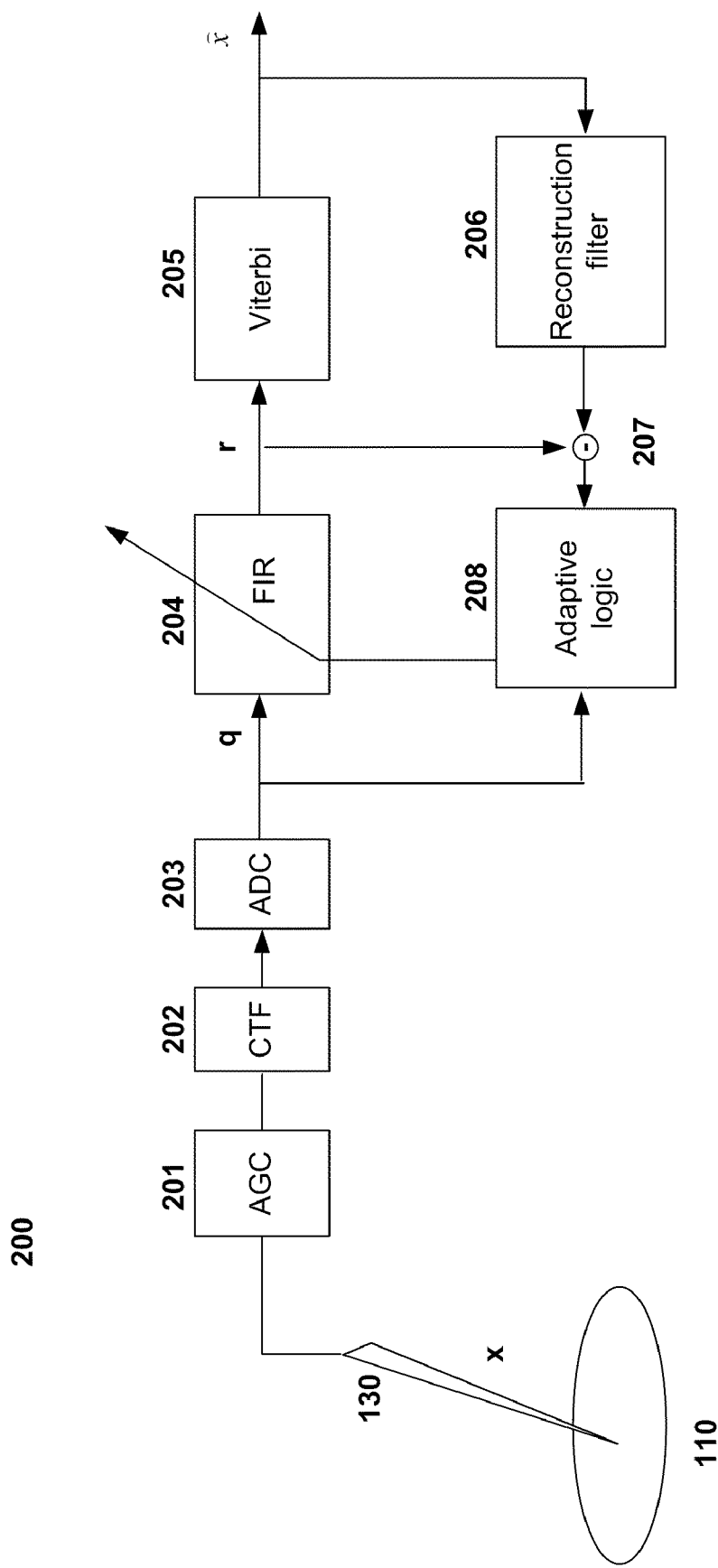
FIG. 2 is a simplified diagram of a hard disk drive read channel.

At the beginning of the operation, the FIFO 901 receives ADC samples, e.g., ten consecutive ADC samples from the ADC 203 in FIG. 2. At the multiplier 902, the tap samples may be multiplied with error samples, e.g., the error samples from the subtractor 207 in FIG. 2. At the multiplier 903, the output from the multiplier 902 may be multiplied with a constant μ to obtain an unconstrained update, wherein μ is programmable by users to change the size of the vector. At the multiplier 904, the unconstrained update may be multiplied with an initial value of P from the memory 911 to obtain a constrained update. At the adder 905, the constrained update from the multiplier 904 may be added to the current FIR taps c from the memory 906. The sum from the adder 905, which is a constrained update to FIR taps c, is sent back to the memory 906, and used to update an FIR equalizer, e.g., the FIR equalizer 204 in FIG. 2. The updated FIR taps may also be multiplied at the multiplier 912 with the matrix A to calculate the current phase direction, e.g., using equation (11).

At the same time, the logic 914 checks whether the current value of the FIR taps c from the memory 906 and an initial value from the memory 907 are far apart enough from each other, e.g., using (19) or (20), and issue a trigger signal to the OR gate 915 if they are far apart enough. The logic 913 may check whether the current value of the phase direction w from the memory 908 is sufficiently far apart from an initial value from the memory 909, e.g., using (21) or (22), and issue a trigger signal to the OR gate 915 if they are far enough apart. If the OR gate 915 receives a trigger signal, either from the logic 913 or from the logic 914, the OR gate 915 may issue a trigger signal to activate the connections in dashed lines to update the current value of FIR tap c in the memory 906, and move its previous value to the memory 907; to update the current value of the phase direction w in the memory 908, and move its previous value to the memory 909; to calculate an updated constraint P at the logic 910 with the updated c and w, and update the constraint P in the memory 911. The updated P may then be used to calculate constrained update of the FIR taps c, and the adaptation may continue.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. An apparatus for (i) adapting a finite impulse response (FIR) equalizer in a hard disk drive read channel and (ii) compensating for an error signal, the apparatus comprising:
a first memory to store a first direction of an FIR response of the FIR equalizer; and
adaptive logic to (i) receive the first direction from the first memory and (ii) calculate a constraint to adapt the FIR response to reduce the error signal,
wherein the constraint prevents adaptation of the FIR response going into the first direction.

2. The apparatus of claim 1, wherein:
the first memory is a gain direction memory; and
the first direction is a gain direction of the FIR response, the gain direction of the FIR response being a change of direction of the FIR response responding to a change in a gain of the FIR response.

3. The apparatus of claim 2, further comprising:
a second memory to store a second direction of the FIR response of the FIR equalizer,
wherein the second direction is a phase direction corresponding to a change of a direction of the FIR response responding to a change in a phase of the FIR response.

4. The apparatus of claim 3, wherein the adaptive logic determines the constraint as follows:

$P = I - V(V^T V)^{-1} V^T$, and $V = [c\ w]$ wherein P is the constraint, and I is the identity matrix.

5. The apparatus of claim 3, further comprising a third determining unit to (i) determine whether a third predetermined condition is met and (ii) enable the adaptive logic to calculate the constraint only in response to the third predetermined condition having been met, wherein the third predetermined condition is:

$w^T w\mathrm{prev}/(\|w\|\cdot\|w\mathrm{prev}\|) < T2$ wherein w and wprev are current and previous values of the phase direction, T2 is a threshold, and 0<T2<1.

6. The apparatus of claim 2, further comprising a first determining unit to (i) determine whether a first predetermined condition is met and (ii) enable the adaptive logic to calculate the constraint only in response to the first predetermined condition having been met.

7. The apparatus of claim 6, wherein the first predetermined condition is:

$c^T c_{prev}/(\|c\|\cdot\|c\mathrm{prev}\|) < T1$ wherein c and cprev are current and previous values of the gain direction respectively, T1 is a threshold, and 0<T1<1.

8. The apparatus of claim 1, wherein:
the first memory is a phase direction memory; and
the first direction is a phase direction of the FIR response, the phase direction of the FIR response being a change of a direction of the FIR response responding to a change in a phase of the FIR response.

9. The apparatus of claim 8, further comprising a second determining unit to (i) determine whether a second predetermined condition is met and (ii) enable the adaptive logic to calculate the constraint only in response to the second predetermined condition having been met, wherein the second predetermined condition is:

$w^T w\mathrm{prev}/(\|w\|\cdot\|w\mathrm{prev}\|) < T2$ wherein w and wprev are current and previous values of the phase direction, T2 is a threshold, and 0<T2<1.

10. The apparatus of claim 1, wherein the constraint limits adaptation of the FIR response to stay generally in a direction perpendicular to the first direction.

11. A method for adapting a finite impulse response (FIR) equalizer in a hard disk drive read channel, the method comprising:
receiving an error signal;
obtaining a first direction of an FIR response of the FIR equalizer; and
calculating a constraint to adapt the FIR response to reduce the error signal, wherein the constraint prevents adaptation of the FIR response going into the first direction.

12. The method of claim 11, wherein said obtaining comprises obtaining a gain direction of the FIR response, the gain direction of the FIR response being a change of direction of the FIR response responding to a change in a gain of the FIR response.

13. The method of claim 12, further comprising: obtaining a second direction of the FIR response of the FIR equalizer, wherein the second direction is a phase direction corresponding to a change of a direction of the FIR response responding to a change in a phase of the FIR response.

14. The method of claim 13, wherein the constraint is determined as follows:

$P = I - V(V^T V)^{-1} V^T$, and $V = [c\ w]$ wherein P is the constraint, and I is the identity matrix.

15. The method of claim 13, further comprising: (i) determining whether a third predetermined condition is met and (ii) calculating the constraint only in response to the third predetermined condition having been met, and wherein the third predetermined condition is:

$w^T w\mathrm{prev}/(\|w\|\cdot\|w\mathrm{prev}\|) < T2$ wherein w and wprev are current and previous values of the phase direction, T2 is a threshold, and 0<T2<1.

16. The method of claim 13, further comprising: imposing a third constraint.

17. The method of claim 16, where the third constraint is a fixed tap constraint.

18. The method of claim 12, further comprising: (i) determining whether a first predetermined condition is met and (ii) calculating the constraint only in response to the first predetermined condition having been met.

19. The method of claim 18, wherein the first predetermined condition is:

$$c^T c_{prev}/(\|c\|\cdot\|cprev\|) < T1$$

wherein c and cprev are current and previous values of the gain direction respectively, T1 is threshold, and 0<T1<1.

20. The method of claim 11, wherein said obtaining comprises obtaining a phase direction of the FIR response, the phase direction of the FIR response being a change of a direction of the FIR response responding to a change in a phase of the FIR response.

21. The method of claim 20, further comprising: (i) determining whether a second predetermined condition is met and (ii) calculating the constraint only in response to the second predetermined condition having been met, wherein the second predetermined condition is:

$$w^T wprev/(\|w\|\cdot\|wprev\|) < T2$$

wherein w and wprev are current and previous values of the phase direction, T2 is a threshold, and 0<T2<1.

22. The method of claim 11, wherein the constraint limits adaptation of the FIR response to stay on a direction generally perpendicular to the first direction.

* * * * *